United States Patent [19]

Yoshie

[11] Patent Number: 5,690,463

[45] Date of Patent: Nov. 25, 1997

[54] BOOK STORAGE/RETRIEVAL APPARATUS

[75] Inventor: Jinichi Yoshie, Matsudo, Japan

[73] Assignee: Nippon Filing Co., Ltd., Tokyo, Japan

[21] Appl. No.: 640,075

[22] Filed: Apr. 30, 1996

Related U.S. Application Data

[63] Continuation-in-part of Ser. No. 328,602, Oct. 25, 1994, abandoned, which is a continuation-in-part of Ser. No. 094,432, Jul. 21, 1993, abandoned.

[30] Foreign Application Priority Data

Jul. 31, 1992 [JP] Japan .................. 4-205313

[51] Int. Cl.⁶ .................. B65G 1/00; B65G 37/00
[52] U.S. Cl. .................. 414/266; 414/268; 414/273; 198/349.1
[58] Field of Search .................. 414/266, 273, 414/277–279, 281, 282, 285, 286, 564; 198/347.1

[56] References Cited

U.S. PATENT DOCUMENTS

| | | | |
|---|---|---|---|
| 3,473,675 | 10/1969 | Goldammer et al. | |
| 3,476,265 | 11/1969 | Powers. | |
| 3,482,712 | 12/1969 | Powers. | |
| 3,536,194 | 10/1970 | Novak | 209/80.5 |
| 3,844,428 | 10/1974 | Olsen. | |
| 4,285,623 | 8/1981 | Stephens | 414/278 |
| 4,546,901 | 10/1985 | Buttarazzi | 221/10 |
| 4,917,227 | 4/1990 | Matsuo et al. | 414/268 |
| 4,932,828 | 6/1990 | Katae et al. | 414/286 |

FOREIGN PATENT DOCUMENTS

| | | | |
|---|---|---|---|
| 2048307 | 2/1990 | Japan . | |
| 4116001 | 4/1992 | Japan . | |
| 223093 | 10/1968 | Sweden | 414/266 |

*Primary Examiner*—William E. Terrell
*Assistant Examiner*—R. B. Johnson
*Attorney, Agent, or Firm*—Joseph Scafetta, Jr.

[57] ABSTRACT

An automated book storage/retrieval apparatus is used in a library or the like storing a large number of books. A designated container is removed from a rack storing a plurality of containers, each having an internal space occupied by a plurality of subcontainers, each subcontainer being capable of storing a plurality of books. The designated container is conveyed to a working station where a selected subcontainer storing a book requested to be borrowed is raised to a position higher than that of the remaining subcontainers. With this operation, the spines of the books in the raised subcontainer can be easily seen by an operator at the working station, thus facilitating a search for and the removal of the desired book from the raised subcontainer.

13 Claims, 16 Drawing Sheets

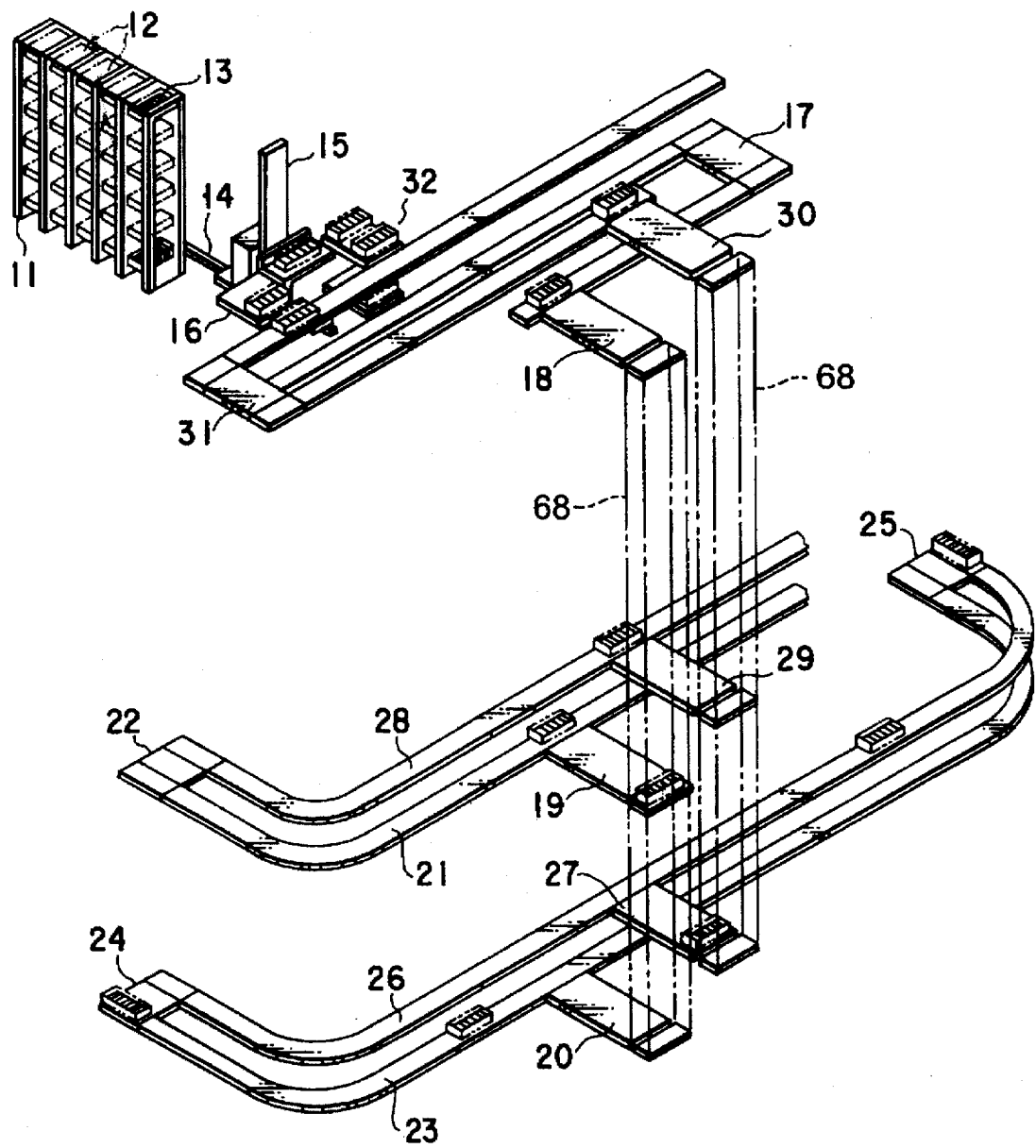
F I G. 1

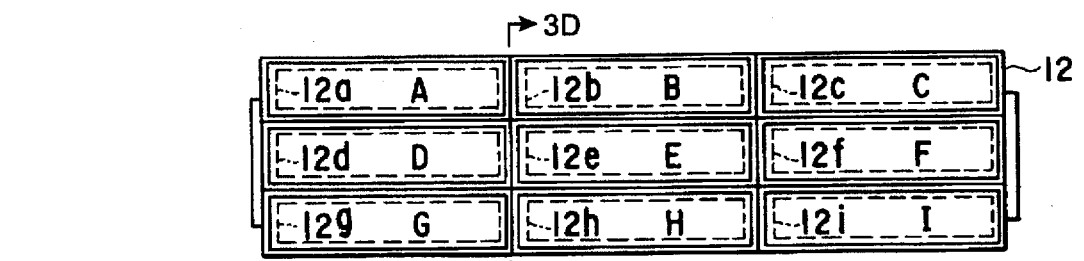
FIG. 3A
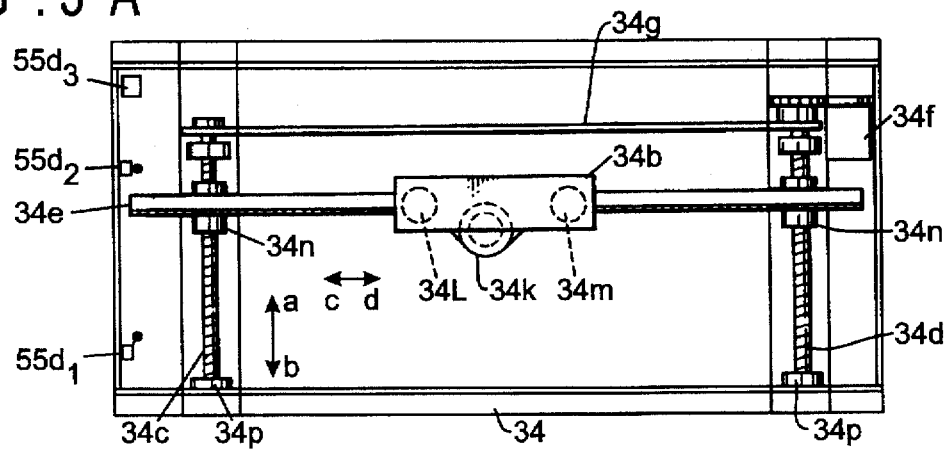
FIG. 3B
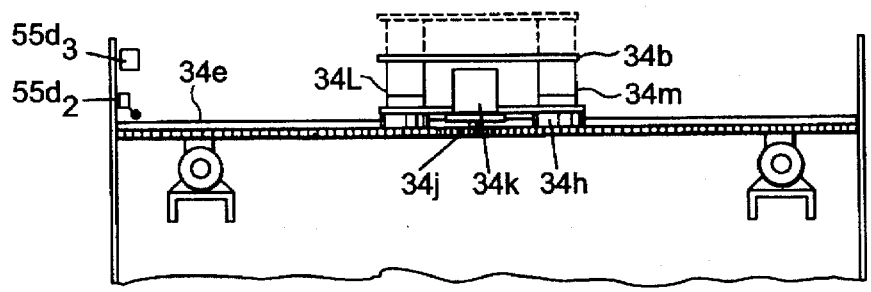
FIG. 3C
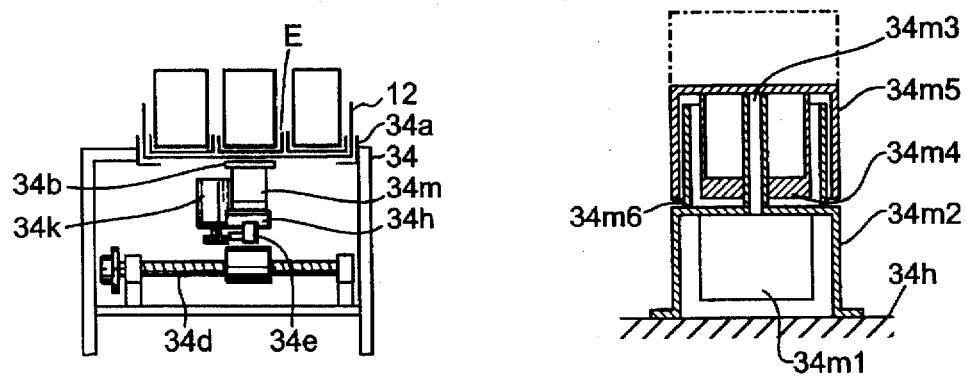
FIG. 3D
FIG. 3E

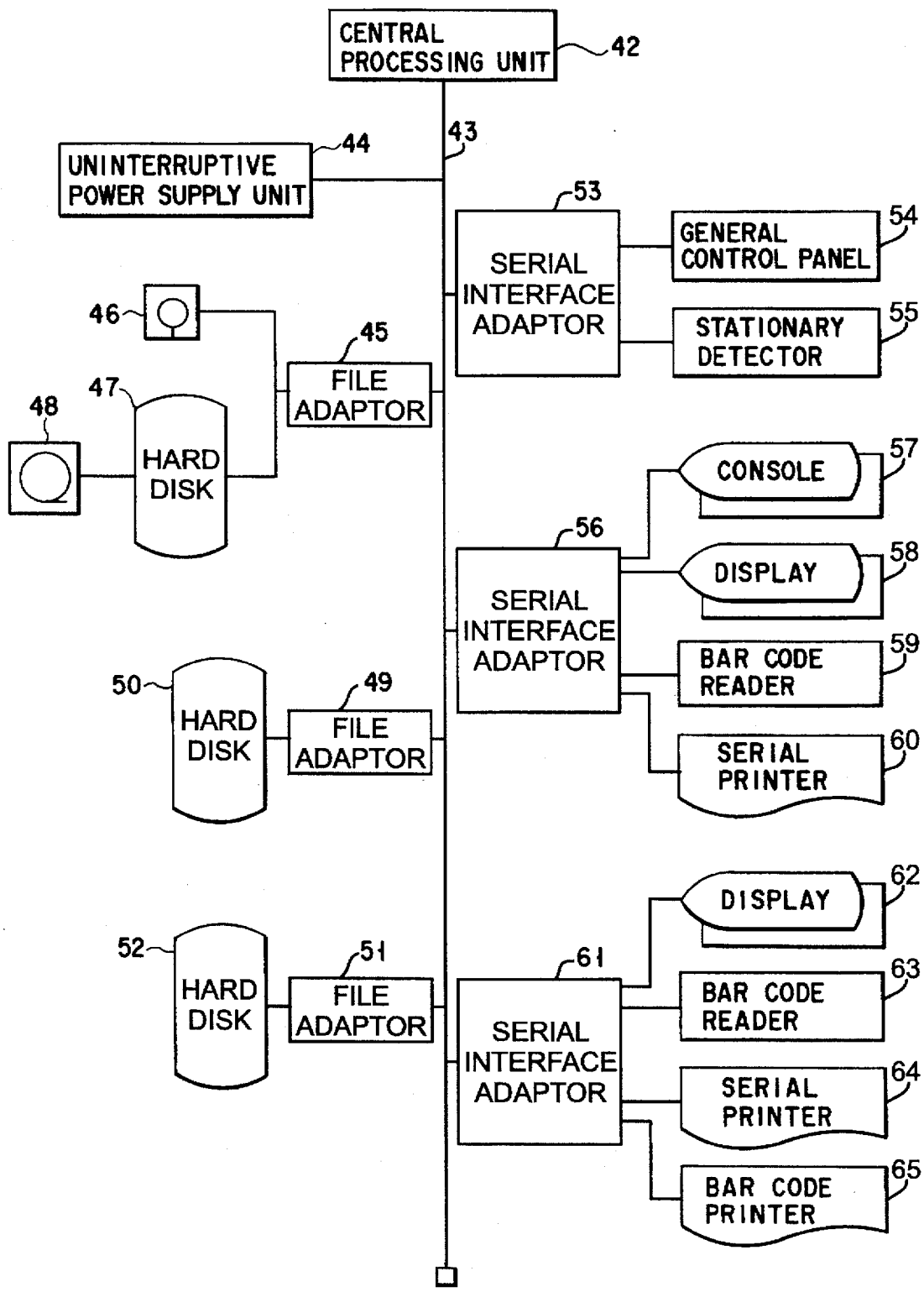
F I G. 4

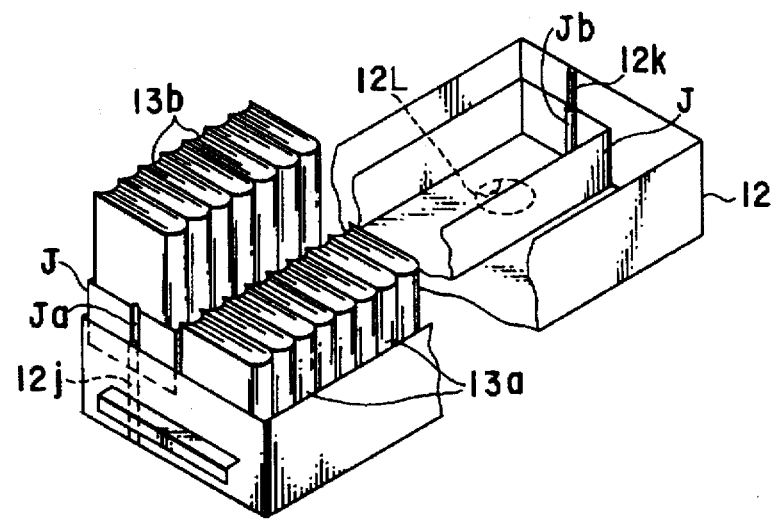
F I G. 11
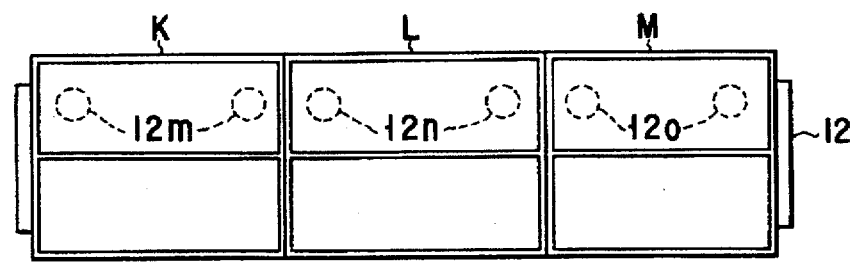
F I G. 12A
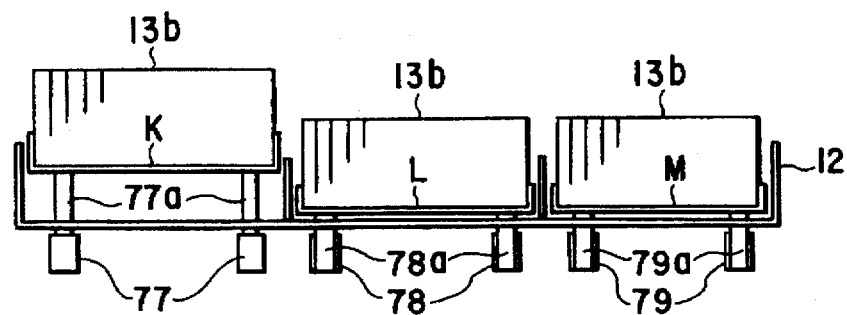
F I G. 12B

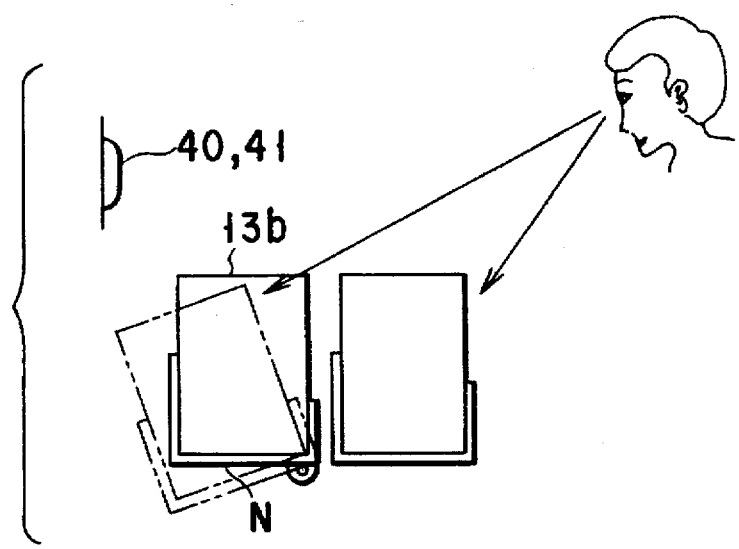
F I G. 16
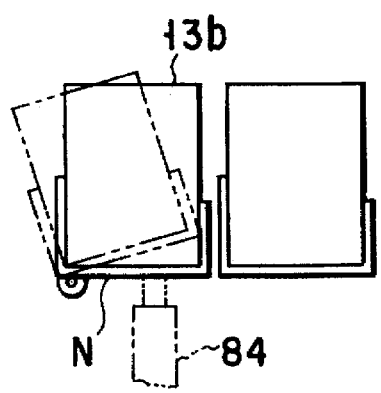
F I G. 17

BOOK STORAGE/RETRIEVAL APPARATUS

CROSS REFERENCES TO RELATED APPLICATIONS

This application is a CIP of Ser. No. 08/328,602, filed Oct. 25, 1994 which, in turn is a CIP of Ser. No. 08/094,432, filed Jul. 21, 1993 now abandoned.

BACKGROUND OF THE INVENTION

1. Field of the Invention

The present invention relates to a book storage/retrieval apparatus suitably custom-made for, e.g., a large library or the like storing a large number of books and, more particularly, to an apparatus designed to facilitate book operations.

2. Description of the Related Art

As is known, AS/RS (automated storage/retrieval systems) have recently been introduced into large libraries or the like having a large collection of books in order to improve the efficiency of operations required to lend and return books. One AS/RS is intended to automate the following operations: removing a book which a customer requests to borrow from a stack room; conveying the book to a circulation counter; recording information associated with removing and filing of books; filing a book; recording the location of the book; and the like. With the system, operations required for removing and filing of books can be accurately and quickly executed.

In an AS/RS of this type, in order to facilitate management of a large number of stored books, a bar code is attached to each book. The books are stored in containers and the containers are filed into or removed from a stack room. For this reason, when removal of a book is requested, a container storing the requested book is automatically removed from the stack room and is conveyed to the circulation counter. The operator searches the container conveyed to the circulation counter for the desired book, and hands the book to the customer. The book is thus lent to the customer.

When filing of a book is requested, a container having an available storage space is automatically removed from the stack room and is conveyed to the circulation counter. The operator puts the book in the container and returns the container automatically to the stack room. With this operation, the book is filed back into storage. In this case, when the container is brought into the Stack room, the bar codes of all the books stored in the container are read to update the stored contents indicating the locations of the books.

In the above-described conventional AS/RS, books are stored in each container in two to three rows in the direction of the depth of the books because the number of containers is excessively increased to downgrade the storage efficiency of the stack room if the books are stored in each container in one row in the direction of the thickness of the books. For this reason, when the operator searches a container conveyed to the circulation counter so as to remove a desired book, the spines of the books in a row located on the far side with respect to the operator are obstructed by the books in a row on the near side and cannot be easily seen, thus resulting in difficulty for the operator in searching for a book and taking it from the container to lend to the customer.

As described above, there is a problem in the conventional AS/RS. Since the books are stored in each container in two or three rows in order to improve the storage efficiency of the stack room, the spines of all books stored in the container cannot be seen with a single glance. It is, therefore, difficult to search for a desired book and take it from the container.

SUMMARY OF THE INVENTION

The present invention has been developed to overcome the above problem and has as its object to provide a book AS/RS which allows an easy search for, and an easy taking of, a desired book from a container in which books are stored in a plurality of rows in the direction of the depth of the books.

According to one embodiment of the present invention, there is provided a book AS/RS comprising: a plurality of containers, each having an inner space divided into a plurality of subcontainers, each capable of storing a plurality of books; a stack room for housing the plurality of containers; a conveying mechanism for removing a designated container from the stack room to a working station, and for returning the container from the working station to the stack room; and an elevator for selectively raising/lowering the container to and from the working station.

According to the above-described arrangement, a plurality of books stored in a container at the working station is selectively raised/lowered in a subcontainer. Therefore, when a subcontainer including a book requested to be removed is raised to a position higher than that of the remaining subcontainers, the spines of the books included in the raised subcontainer can be seen, thus making it easy to search the subcontainer for a book and to take the desired book therefrom.

BRIEF DESCRIPTION OF THE DRAWINGS

FIG. 1 is a perspective view showing a book AS/RS according to an embodiment of the present invention to explain the overall arrangement of the apparatus;

FIGS. 3A to 3E are views, of which FIGS. 3B–3D are top, side and end views, respectively, for explaining the detailed arrangement of a container support unit at the second-floor working station;

FIG. 4 is a block diagram for explaining the detailed arrangement of an electronic system for controlling the embodiment;

FIG. 11 is a perspective view for explaining the detailed arrangement of a container in the modification;

FIGS. 12A and 12B are top and side views, respectively, for explaining an operation of raising/lowering a subcontainer in the modification;

FIG. 16 is an end view for explaining one means for pivoting a subcontainer in the modification;

FIG. 17 is an end view for explaining another means for pivoting a subcontainer in the modification;

DETAILED DESCRIPTION OF THE PREFERRED EMBODIMENTS

Figure 2:
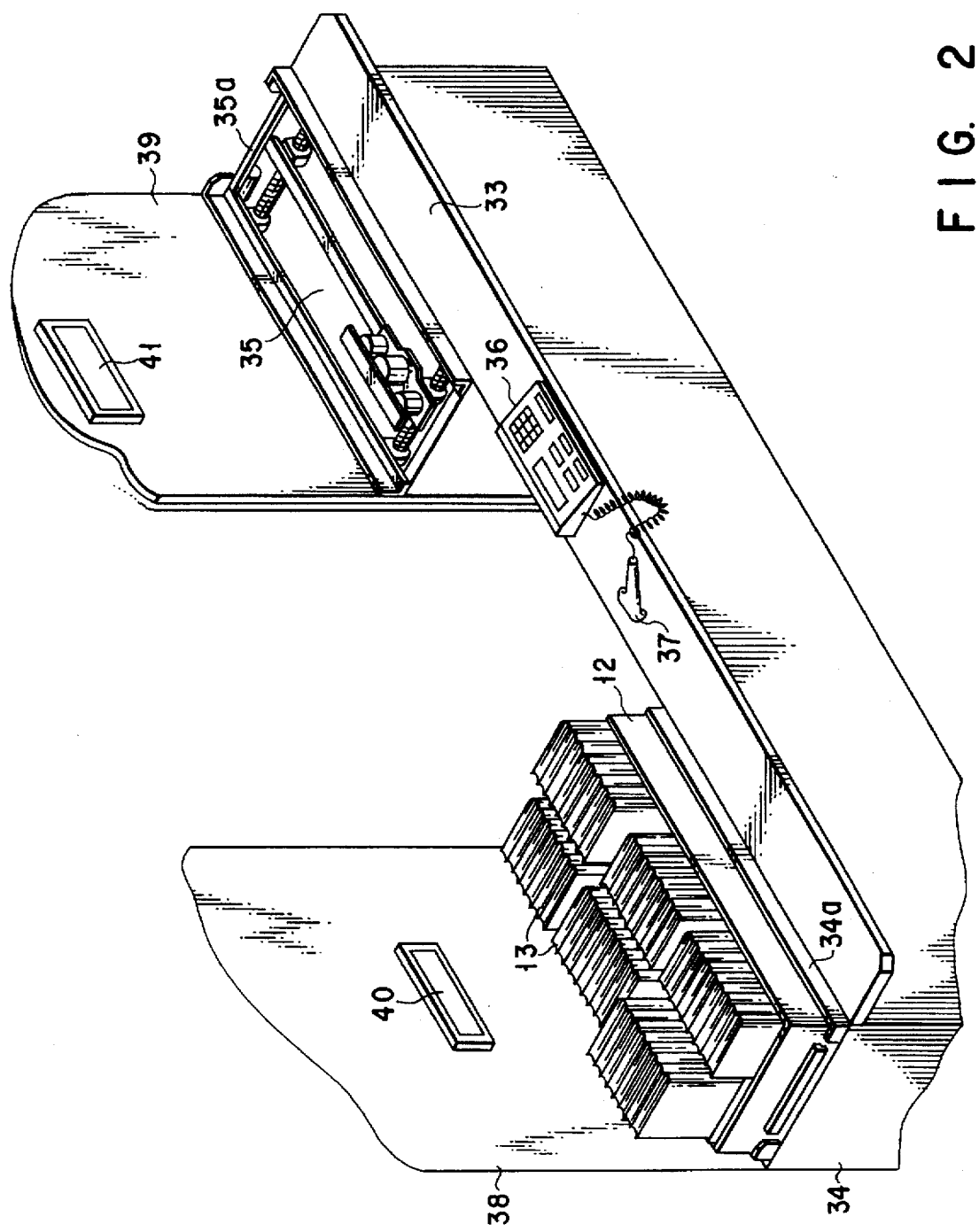
FIG. 2 is a perspective view for explaining the detailed arrangement of a second-floor working station in the embodiment.

An embodiment of the present invention will be described in detail below with reference to the accompanying drawings. FIG. 1 shows the overall arrangement of a book AS/RS comprising the embodiment. Racks 11 holding containers 12 are arranged in a third-floor stack room in a library. A plurality of containers 12 is held in the racks 11. A plurality of books 13 is stored in each of the containers 12, in a plurality of rows arranged in the direction of the depth of the books 13.

A stacker crane 15 travels on a rail 14 in front of the racks 11. To remove the books 13, the stacker crane 15 retrieves a desired container 12 from the racks 11 and transfers it to a removal rack station 16. The container 12 on the removal rack station 16 is then transferred on a conveyor 17 to a carrying-out port 18. The container 12 is then conveyed on a vertical elevator 68 either to a second-floor carrying-in port 19 or to a first-floor carrying-in port 20.

The container 12 at the second-floor carrying-in port 19 is then transferred on a conveyor 21 to a second-floor working station 22 used as a circulation counter. The container 12 at the first-floor carrying-in port 20 is likewise transferred on a conveyor 23 to one of two first-floor working stations 24 or 25 used as circulation counters.

After the operator has removed the desired book 13, the container 12 located at one first-floor working station 24 or 25 is transferred on a conveyor 26 to a first-floor carrying-out port 27. Likewise, after another operator has removed a different book 13, the container 12 located at the second-floor working station 22 is transferred on a conveyor 28 to a second-floor carrying-out port 29. The container 12 conveyed to the first-floor carrying-out port 27 or the second-floor carrying-out port 29 is then transferred on the vertical elevator 68 to a carrying-in port 30 on the third floor. The container 12 at the carrying-in port 30 is thereafter transferred on a conveyor 31 to a filing rack station 32 and is subsequently filed into the racks 11 by the stacker crane 15.

FIG. 2 shows the details of the second-floor working station 22. The first-floor stations 24 and 25 have the same arrangement as that of the second-floor station 22, and hence a description thereof will be omitted. The second-floor station 22 is equipped with a counter table 33 and two container support units 34 and 35 arranged along the counter table 33. The container 12 at the second-floor station 22 is selectively placed on one of the container support units 34 and 35.

An operation unit 36 and a bar code reader 37 are arranged on the counter table 33. The operation unit 36 is used by a worker to perform various tasks associated with the filing/removing of the books 13. The bar code reader 37 serves to read bar codes attached to the books 13. Display units 40 and 41 are respectively arranged on walls 38 and 39 on the rear sides of the container support units 34 and 35. The display units 40 and 41 indicate the titles, book numbers, and the like information about the books 13 to be removed from the containers 12.

The container support units 34 and 35 respectively have substantially frame-like support bars 34a and 35a for holding bottom peripheral edges of the container 12 because the container 12 has a bottom grid which is mostly exposed in a supported state.

As shown in the top view of FIG. 3A, the container 12 contains nine subcontainers A to I. The books 13 are stored in each of the subcontainers A to I in a row in the direction of their thickness. Openings 12a to 12i are respectively formed in the bottom of the container 12 at positions corresponding to the subcontainers A to I, as indicated by the broken lines. In other words, the subcontainers A to I respectively have their bottoms supported by the bottom grid of the container 12.

As shown in the top view of FIG. 3B, the container support unit 34 has a lift plate 34b arranged under the bottom of the container 12. Essentially, the top view of the container 12 in FIG. 3A can be imposed over the top view of the container support unit 34 to give the reader a better understanding of the working relationship between the container 12 and the container support unit 34. The lift plate 34b can be selectively caused to extend through the openings 12a to 12i formed in the bottom grid of the container 12. Two screw shafts 34c and 34d are arranged as fixed y-axes in the container support unit 34 to extend parallel to each other in a transverse direction of the container 12. Two end portions of a gear rack 34e are threadably engaged with the screw shafts 34c and 34d such that the gear rack 34e functions as a movable x-axis as it extends along the longitudinal direction of the container 12.

With this arrangement, the two screw shafts 34c and 34d are simultaneously rotated about their longitudinal axes by the rotational force of a motor 34f through a transmission 34g so that the movable gear rack 34e is translated in the directions indicated by arrows a and b. The above-mentioned lift plate 34b is supported on the gear rack 34e by a support plate 34h which is slidable along the gear rack 34e in the longitudinal direction; i.e. the directions indicated by arrows c and d. Nuts 34n secure the gear rack 34e onto the screw shafts 34c and 34d while bearings 34p secure the screw shafts 34c and 34d onto the container support unit 34.

As shown in the side view of FIG. 3C, the lift plate 34b is held by the support plate 34h which is slidably secured onto the gear rack 34e. The support plate 34h is moved along the gear rack 34e when the rotational force of a motor 34k is transmitted to a gear 34j which meshes with the gear rack 34e.

A pair of lifting piston cylinders 34L and 34m for respectively supporting the two end portions of the lift plate 34b are disposed on the support plate 34h. These cylinders 34L and 34m move the lift plate 34b upwards and downwards from the position indicated by the phantom lines in FIG. 3C.

By moving in the directions indicated by the arrows a, b, c, and d in FIG. 3B, the lift plate 34b can be selectively caused to sit underneath a desired one of the openings 12a to 12i in the bottom grid of the container 12 shown in FIG. 3A.

FIGS. 3B and 3C additionally show the fixing points of several position limit switches, specifically y-axis position detector 55d1, x-axis position detector 55d2, and container position detector 55d3.

As shown in the cross-sectional end view of FIG. 3D taken along line 3D—3D in FIG. 3A, the lift plate 34b is moved upwards while it is located underneath the bottom of the middle subcontainer E in the container 12. Thereafter, the lift plate 34b extends up through the opening 12e in FIG. 3A to lift up and out the middle subcontainer E from the container 12. Thus, the operator can read the spines on the books 13 now exposed in the subcontainer E.

The container support unit 35 has the same arrangement as that of the container support unit 34 and operates in the same manner as described above. Such container support units 34 and 35 are respectively arranged in the first-floor working stations 24 and 25. Therefore, the operation of the container support unit 35 does not need to be described.

FIG. 3E shows the detail of the lifting piston cylinder 34m. The cylinder 34L has the same structure as that of the cylinder 34m, so its detail is omitted. In the cylinder 34m, a main driving motor 34m1 is supported by a fitting member 34m2 fixed to the support plate 34h.

The rotation axle 34m3 of the motor 34m1 has a helical groove at its outer wall, at which a nut 34m4 has inner helical groove screws such that the nut 34m4 can be moved along with the rotation axle 34m3. The nut 34m4 is fixed to an elevating member 34m5 formed with a substantially cylindrical shape. The rotation of the elevating member 34m5 is controlled by a guide member 34m6 fixed to the fitting member 34m2. In this structure, the elevating member 34m5 is raised/lowered by the driving motor 34m1 in a forward/reverse direction.

FIG. 4 shows a control system for the book AS/RS described above. A central processing unit (CPU) 42 incorporates a microprocessor (not shown). An uninterruptive power supply unit 44 is connected to the CPU 42 through a bus line 43. A floppy disk 46, a hard disk 47 in which system control programs are stored, and a cartridge tape 48 are connected to the CPU 42 through the bus line 43 and a file adaptor 45. A hard disk 50 in which book information is stored is connected to the CPU 42 through the bus line 43 and a file adaptor 49. A hard disk 52 in which backup information is stored is connected to the CPU 42 through the bus line 43 and a file adaptor 51.

A general control panel 54 and a stationary detector 55 are connected to the CPU 42 through the bus line 43 and a serial interface adaptor 53. The general control panel 54, which will be described in detail later, generally controls the following: the stacker crane 15; the vertical elevator 68; the conveyors 17, 21, 23, 26, 28, and 31; and the container support units 34 and 35. The general control panel 54 also performs control operations on the basis of detection results obtained by the stationary detector 55 for determining the position of the container 12.

A console 57, a display 58, a bar code reader 59 (corresponding to the operation unit 36, the bar code reader 37, and the display units 40 and 41 shown in FIG. 2), and a serial printer 60 are connected to the CPU 42 through the bus line 43 and a serial interface adaptor 56. The console 57, the display 58, the bar code reader 59, and the serial printer 60 are arranged at the second-floor working station 22.

A display 62, a bar code reader 63, a serial printer 64, and a bar code printer 65 are connected to the CPU 42 through the bus line 43 and a serial interface adaptor 61. The display 62, the bar code reader 63, the serial printer 64, and the bar code printer 65 are arranged at each of the first-floor working stations 24 and 25.

Figure 5:
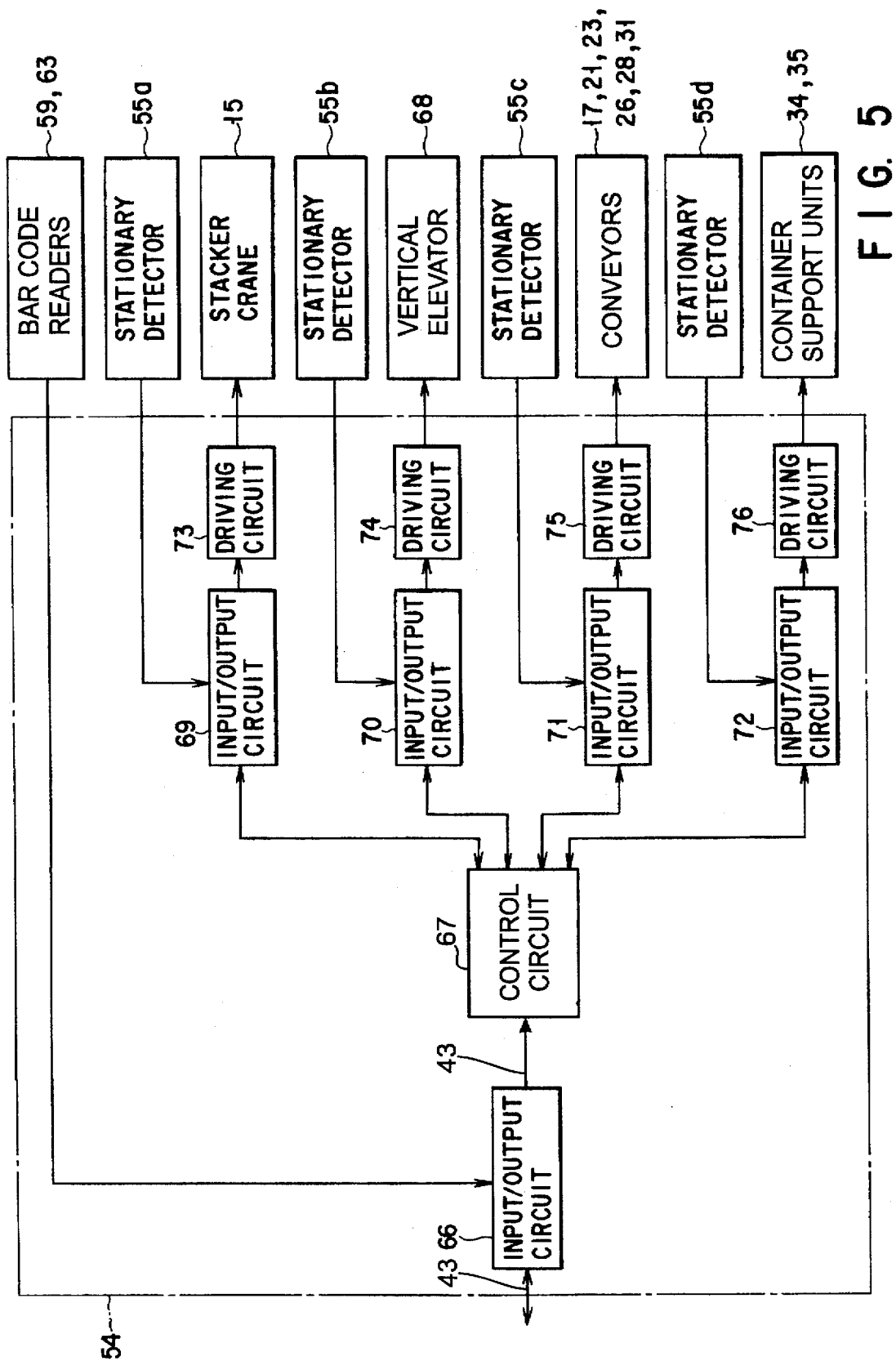
FIG. 5 is a block diagram for explaining the detailed arrangement of a general control panel in the electronic system.

FIG. 5 shows the detailed arrangement of the general control panel 54. The bus line 43 is connected to a control circuit 67 through an input/output circuit 66. The control circuit 67 generates signals and supplies them to the respective components to be controlled: the stacker crane 15; the vertical elevator 68; the conveyors 17, 21, 23, 26, 28, and 31; and the container support units 34 and 35. The signals are sent through input/output circuits 69, 70, 71, and 72 and driving circuits 73, 74, 75, and 76, respectively.

Stationary detectors 55a, 55b, 55c, and 55d are respectively arranged in the stacker crane 15, the vertical elevator 68, the conveyors 17, 21, 23, 26, 28, and 31, and the container support units 34 and 35. Each stationary detector 55a through 55d serves to detect the position of the container 12. Output signals from the stationary detectors 55a through 55d are respectively supplied to the corresponding input/output circuits 69, 70, 71, and 72 and are used to generate control signals. Outputs from the bar code readers 59 and 63 are supplied directly via the input/output circuit 66 to the general control panel 54, i.e. to drive the stacker crane 15, the vertical elevator 68, the conveyors 17, 21, 23, 26, 28, and 31, and the container support units 34 and 35.

Figure 6:
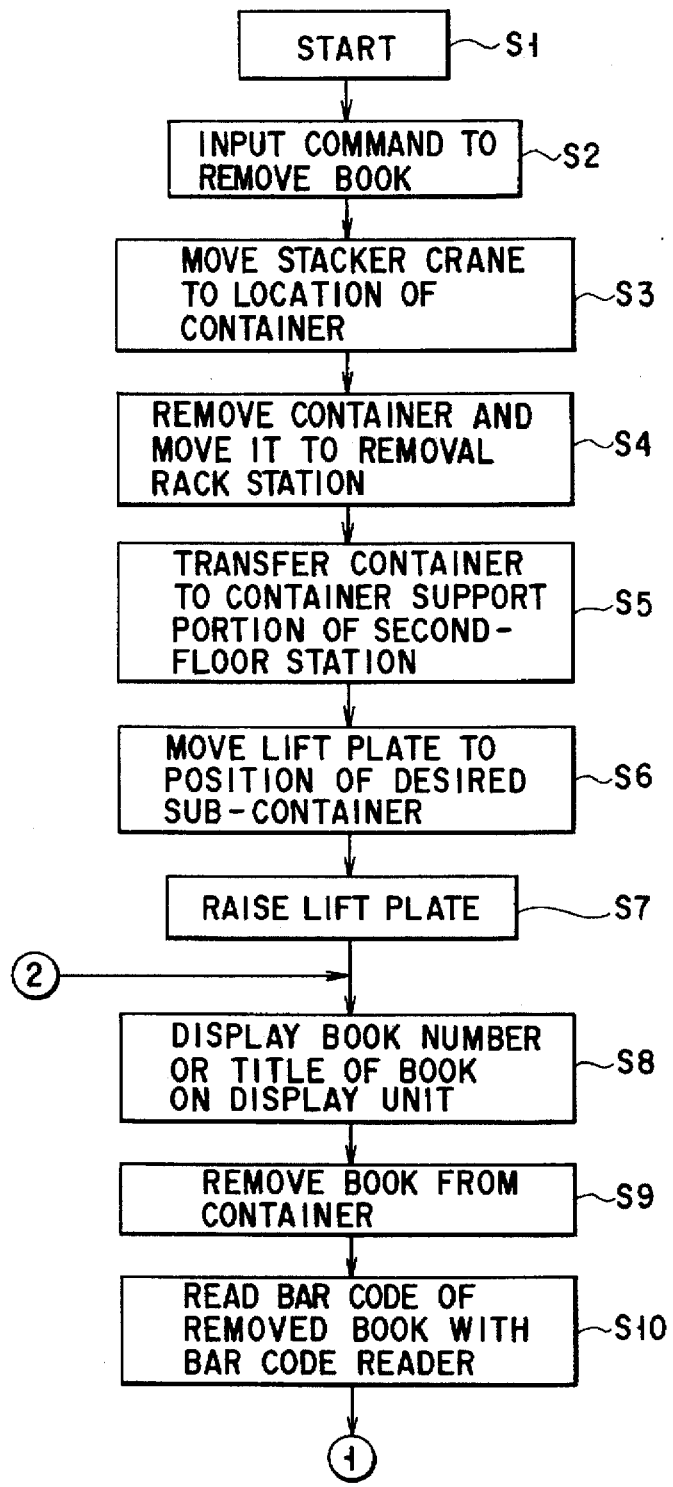
FIG. 6 is an initial part of a flow chart for explaining an operation to be performed to remove a book.
Figure 7:
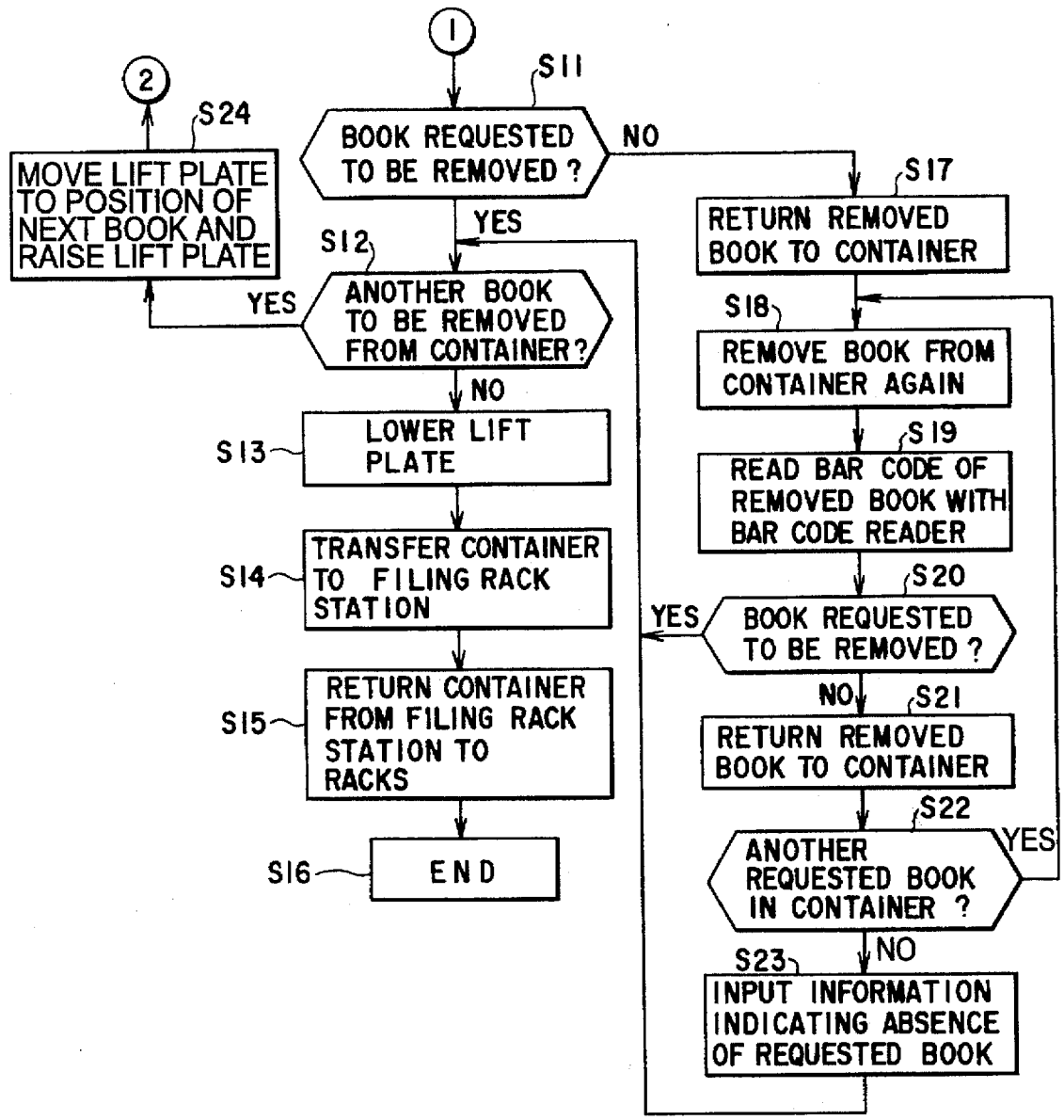
FIG. 7 is a final part of the flow chart for explaining the operation to be performed to remove the book.

An operation of the book AS/RS having the above-described arrangement will be detailed below. FIGS. 6 and 7 are flow charts for explaining an operation for removing one book 13. An operation for removing the book 13 is started when, for example, a customer informs an operator at the second-floor station 22 of the book 13 that he/she wants to remove (step S1). In step S2, the operator at the second-floor station 22 operates the console 57 to input a command to the CPU 42 for removing the requested book 13.

In step S3, upon reception of the book-removing command, the CPU 42 instructs the general control panel 54 to move the stacker crane 15 to the location of the container 12 holding the requested book 13 in the racks 11. In step S4, the CPU 42 causes the stacker crane 15 to retrieve the container 12 from the racks 11 and move the container 12 to the removal rack station 16. In step S5, the CPU 42 drives the vertical elevator 68 and the conveyors 17 and 21 through the general control panel 54 so as to transfer the container 12 from the removal rack station 16 to, for example, the container support unit 34 at the second-floor station 22, thus causing the support bars 34a to hold the container 12.

Subsequently, in step S6, the CPU 42 directs the container support unit 34 through the general control panel 54 to move the lift plate 34b to a position underneath one of the subcontainers A to I in the container 12 in which the requested book 13 is stored. In step S7, the CPU 42 orders the lift plate 34b to be raised. With this operation, the subcontainer E which contains the requested book 13 is lifted to a position higher than that of the remaining subcontainers A to D and F to I. As a result, the spines of the books 13 stored in the raised subcontainer E can be easily seen by the operator.

In step S8, the CPU 42 tells the display unit 40 through the general control panel 54 to show the book number or title of the requested book 13. In step S9, the operator searches the subcontainer E for the book 13 having the number or title shown on the display unit 40, and removes it. In step S10, the operator reads the bar code attached to the removed book 13 with the bar code reader 59.

In step S11 of FIG. 7, the CPU 42 checks whether the read bar code corresponds to the requested book 13. If the read bar code corresponds to the requested book 13 (YES), the CPU 42 checks in step S12 whether there is another book 13 which is requested to be removed from the container 12. If there is no other book 13 which is requested to be removed (NO), the CPU 42 causes the lift plate 34b through the general control panel 54 in step S13 to lower the subcontainer E.

In step S14, the CPU 42 drives the vertical elevator 68 and the conveyors 28 and 31 through the general control panel 54 to transfer the container 12 from the container support unit 34 to the filing rack station 32. In step S15, the CPU 42 directs the stacker crane 15 to remove the container 12 from the filing rack station 32 to its original position in the racks 11, thus ending the operation of removing one book 13 (step S16).

If it is determined in step S11 that the read bar code does not correspond to the requested book 13 (NO), the operator files the book 13 at the original position in the subcontainer E in step S17. In step S18, the operator searches for the book 13 having the number or title shown on the display unit 40 and removes another book 13. In step S19, the operator reads the bar code attached to the removed book 13 with the bar code reader 59.

In step S20, the CPU 42 checks whether the read bar code corresponds to the requested book 13. If the read bar code corresponds to the requested book 13 (YES), the CPU 42 shifts the flow over to step S12. If the bar code read in step S19 does not correspond to the requested book 13 (NO), the operator again files the book 13 at the original position in the subcontainer E in step S21. In step S22, the operator checks whether there is another requested book 13 in the subcontainer E.

If there is another requested book 13 in the lifted subcontainer E (YES), the operator returns to execute the processing in step S18. If the requested book 13 is not in the lifted subcontainer E (NO), the operator inputs information to the CPU 42 by operating the console 57 in step S23. The CPU 42 then shifts the flow back to step S12.

If it is determined in step S12 that there is another book 13 which is requested to be removed from the container 12 (YES) the CPU 42 controls the general control panel 54 in step S24 to lower the lift plate 34b and move it to a position underneath another one of the subcontainers A to I in which the next requested book 13 is stored. The flow then shifts back to step S8.

Figure 8:
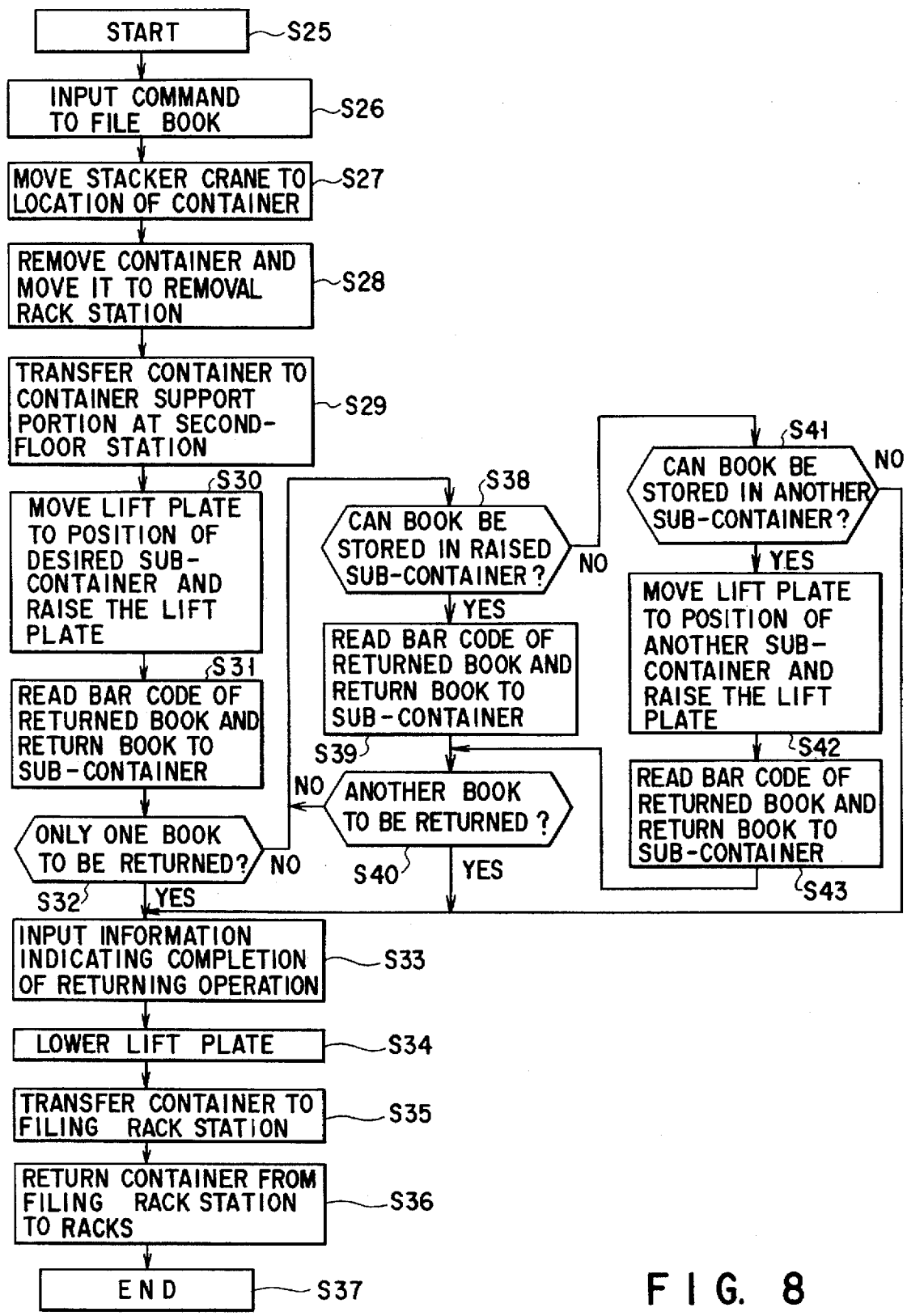
FIG. 8 is a flow chart for explaining an operation to be performed to file a book.

FIG. 8 is a flow chart for explaining an operation for filing one book 13. An operation for removing the book 13 is started in step S25 when a customer hands the book 13 to be filed to, for example, the operator at the second-floor station 22. In step S26, the operator at the second-floor station 22 operates the console 57 to input a command to the CPU 42 for filing the returned book 13.

Upon reception of the book-filing command in step S27, the CPU 42 causes the general control panel 54 to move the stacker crane 15 along the racks 11 to the location of the subcontainer 12 which has an available storage space. In step S28, the container 12 is removed from the racks 11 by the stacker crane 15 and is moved to the removal rack station 16. In step S29, the CPU 42 drives the vertical elevator 68 and the conveyors 17 and 21 through the general control panel 54 to transfer the container 12 from the removal rack station 16, to, for example, the container support unit 34 at the second-floor station 22, thus causing the support bars 34a to hold the container 12.

In step S30, the CPU 42 causes the container support unit 34 through the general control panel 54 to move the lift plate 34b to a position underneath subcontainer E which has the available storage space, and to raise the lift plate 34b. In step S31, the operator reads the bar code attached to the returned book 13 with the bar code reader 59, and places it in the available storage space in the raised subcontainer E.

In step S32, the operator checks whether there is only one book 13 to be returned. If there is only one book to be filed (YES), the operator operates the console 57 in step S33 to input information indicating the completion of the filing operation to the CPU 42. In step S34, the CPU 42 directs the lift plate 34b through the general control panel 54 to lower the subcontainer E.

Subsequently, in step S35, the CPU 42 drives the vertical elevator 68 and the conveyors 28 and 31 through the general control panel 54 to transfer the container 12 from the container support unit 34 to the filing rack station 32. In step S36, the CPU 42 instructs the stacker crane 15 to return the container 12 from the filing rack station 32 to its original position in the racks 11, thus ending the operation for filing one book 13 (step S37).

If it is determined in step S32 that there is more than one book 13 to be filed (NO), the operator checks in step S38 whether there is an available space for storing another returned book 13 in the currently raised subcontainer E. If there is an available space for storing another returned book 13 (YES), the operator reads the bar code attached to the returned book 13 with the bar code reader 59 and files the second book 13 in the raised subcontainer E in step S39. In step S40, the operator checks whether there is yet another book 13 to be filed. If there is no third book 13 to be returned (YES), the processing in step S33 is executed. If there is another book 13 to be filed (NO), the processing in step S38 is executed.

If it is determined in step S38 that there is no available space for storing another returned book 13 in the currently raised subcontainer E (NO), the operator checks in step S41 whether there is an available space for storing the returned book 13 in any one of the remaining subcontainers A to D or F to I. If there is no available space for storing the returned book 13 in any one of the remaining subcontainers A to D or F to I (NO), the operator executes the processing in step S33. If there is an available space for storing the returned book 13 in one of the remaining subcontainers A to D or F to I (YES), the operator operates the console 57 in step S42 to lower the lift plate 34b, to move it to a position underneath another subcontainer having the available storage space, and to raise it. In step S43, the operator reads the bar code attached to the returned book 13 with the bar code reader 59 and files the book 13 in the second raised subcontainer. The operator then executes the processing in step S40.

According to the arrangement of the embodiment described above, the container 12 with the book 13 which is requested is removed from the racks 11 is transferred to the container support unit 34 at the second-floor station 22. While the container 12 is held on the container support unit 34, one of the subcontainers A to I, for example, subcontainer E in the container 12, in which the requested book 13 is stored, is raised to a position higher than that of the remaining subcontainers A to D and F to I. With this operation, the spines of the books 13 stored in the raised subcontainer E can be seen by the operator, thus making it easy to search for the requested book 13 in the container 12 and to take the book 13 therefrom.

In addition, when the book 13 is to be returned, one of the subcontainers A to I, for example, subcontainer E, which has an available storage space, is raised. With this operation, the operator can easily file a book 13 in the one partially empty subcontainer E, without selecting one of the completely filled subcontainers A to D or F to I.

Figure 9:
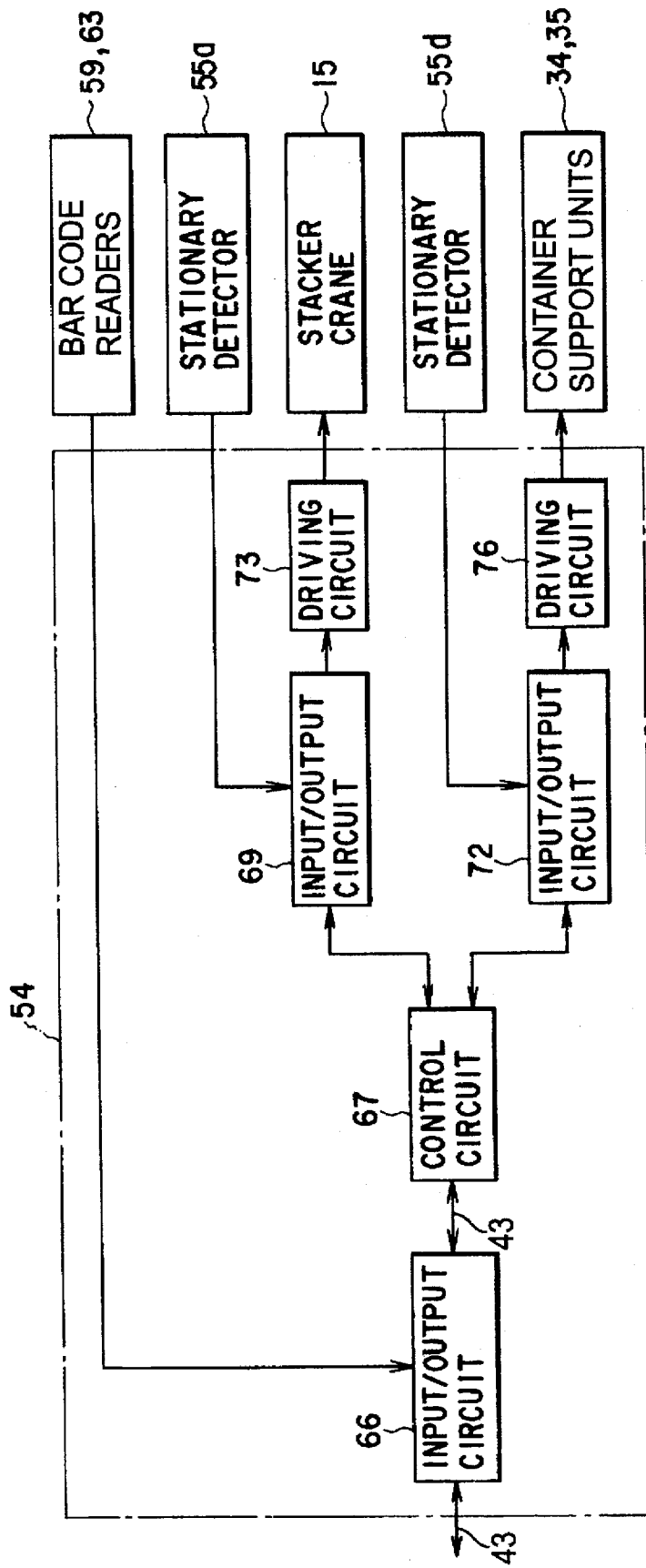
FIG. 9 is a block diagram for explaining the detailed arrangement of a general control panel according to a modification of the embodiment.
Figure 10:
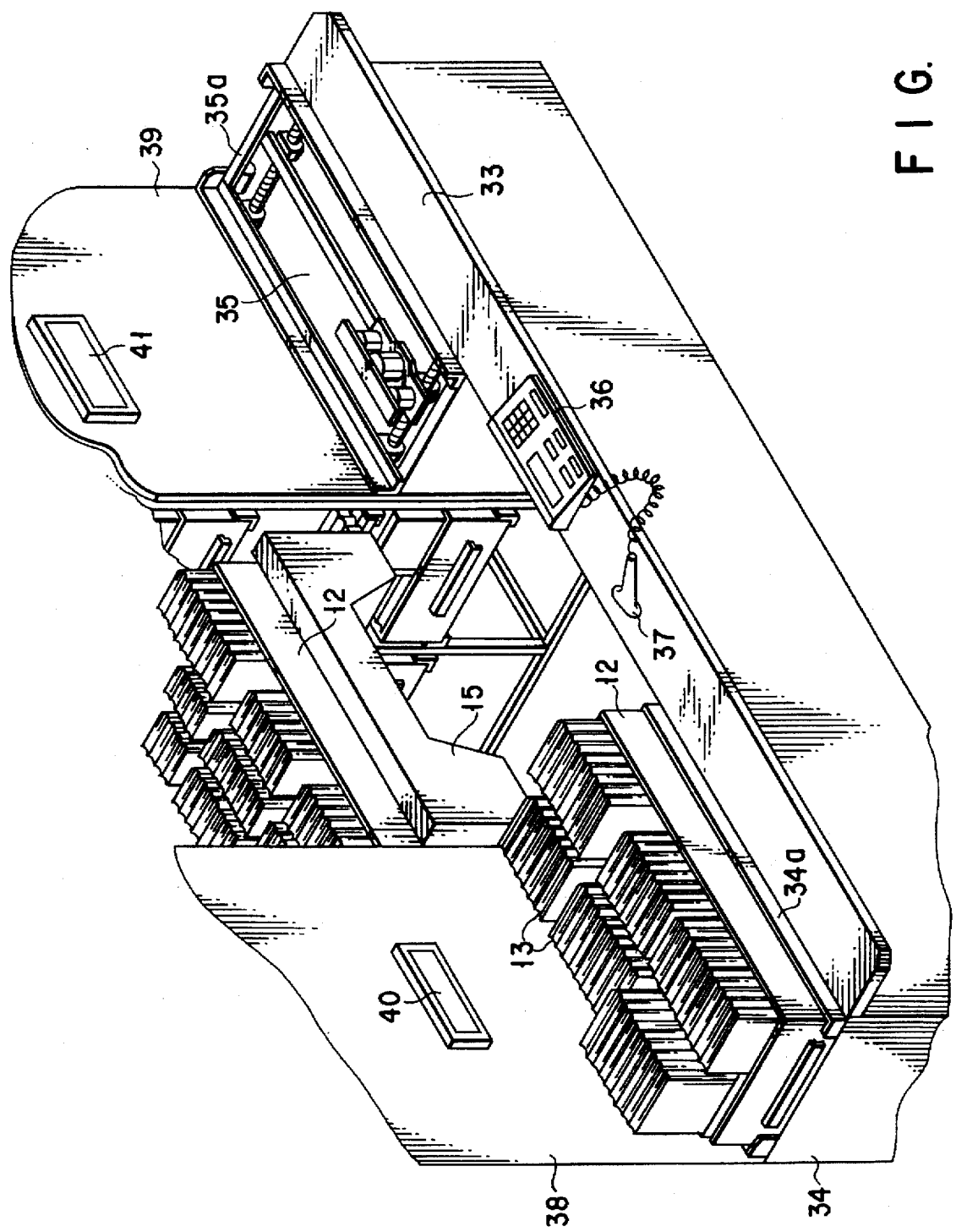
FIG. 10 is a perspective view for explaining the detailed arrangement of the second-floor working station in the modification.

A modification of the above-described embodiment will be detailed below. The book AS/RS shown in FIG. 1 exemplifies a large system using the stacker crane 15, the vertical elevator 68, and the conveyors 17, 21, 23, 26, 28, and 31, to transfer the container 12 between the racks 11 and the second-floor station 22 or the first-floor stations 24 and 25. On the other hand, a small AS/RS, e.g. a system designed to transfer the container 12 between the racks 11 and a working station by using only the stacker crane 15 may have the general control panel 54 with an arrangement such as the one shown in FIG. 9, i.e. the control panel 54 for moving the stacker crane 15 and the container support units 34 and 35 at the working station. In this case, as shown in FIG. 10, the working station is designed such that the container 12 conveyed by the stacker crane 15 is selectively held by the container support units 34 and 35 on both sides of the operator (not shown) standing at the operation unit 36.

FIG. 11 shows a modification of the container 12. In this modification, the height of the container 12 is set to be about one-half that of the books 13 stored therein. Therefore, the spine of each book 13 is exposed while it is stored in the container 12. The plurality of books 13 can be stored in the container 12 in two rows in the direction of their depth, i.e., a front row (books 13a) on the front side with respect to the operator and a rear row (books 13b) on the rear side. In this container 12, no subcontainer A-I is provided with respect to the books 13a of the front row, but only the books 13b of the rear row are stored in a subcontainer J.

This subcontainer J is held in the container 12 and is movable in the vertical direction in FIG. 11 due to a pair of guide grooves Ja and Jb which are respectively fitted around a pair of guide projections 12j and 12k. The guide grooves Ja and Jb are respectively formed in two end plates of the subcontainer J and extend in the vertical direction. The guide projections 12j and 12k are respectively formed on two short sides of the container 12 and also extend in the vertical direction. A plurality of circular throughholes 12L is formed in the bottom of the container 12 underneath the subcontainer J. Lifting piston cylinders (not shown) extend through the circular throughholes 12L to raise the subcontainer J while the guide grooves Ja and Jb slide upwardly along the guide projections 12j and 12k inside the container 12.

With the above-described arrangement, if the requested book 13 is among the books 13a in the front row, the subcontainer J is not raised, and the operator reads the spines on the books 13a in the front row to search for the requested book 13. If the requested book 13 is among the books 13b in the rear row, the subcontainer J is raised to allow the operator to read the spines of the books 13b in the rear row. With this operation, the operator can search for and easily find the requested book 13.

As shown in the top view of FIG. 12A, three subcontainers K, L, and M for storing the books 13b of the rear row are held in the container 12. Pairs of circular throughholes 12m, 12n, and 12o are respectively formed in the bottom of the container 12 underneath the subcontainers K, L, and M. As shown in the side view of FIG. 12B, three pairs of lifting pistons 77a, 78a, and 79a inside the three cylinders 77, 78, and 79 extend through the three pairs of circular throughholes 12m, 12n, and 12o respectively, so that the subcontainers K, L, and M can be independently raised/lowered.

With this arrangement, since the books 13b of the rear row can be raised/lowered in one of the three subcontainers K, L, and M, the range in which the operator searches through the books 13b of the rear row is narrowed to facilitate finding the desired book 13.

Figure 13:
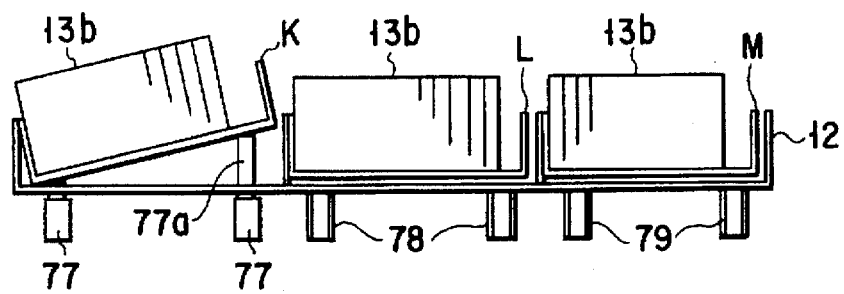
FIG. 13 is a side view for explaining a case wherein the operation of raising/lowering a subcontainer in the modification is partly modified to tilt a plurality of books.

If, for example, as shown in FIG. 13, only one lifting piston 77a in the pair of cylinders 77 is raised to tilt the subcontainer K, the books 13b slide together to one side of the subcontainer K to provide a space for the operator to file a returned book 13. In this case, if the piston 77a is raised while it is vibrated in the vertical direction, the books 13b in the subcontainer K can be brought together to one side more effectively.

Figure 14:
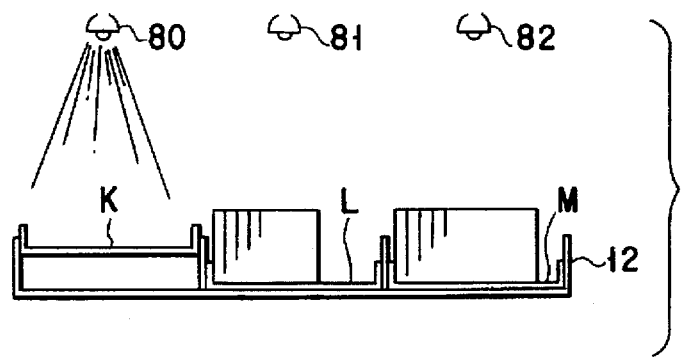
FIG. 14 is a side view for explaining a means for selectively illuminating a raised subcontainer in the modification.
Figure 15:
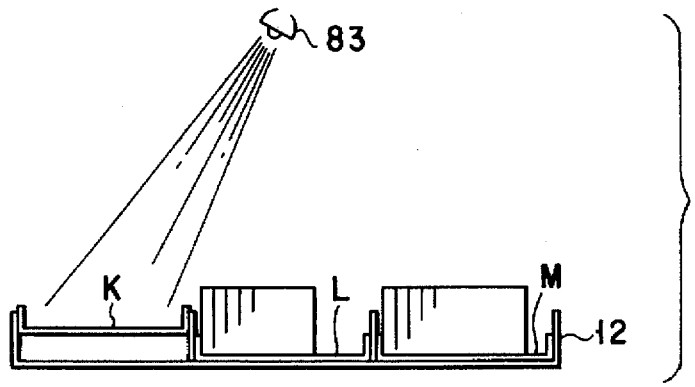
FIG. 15 is a side view for explaining another means for selectively illuminating a raised subcontainer in the modification.

As shown in FIG. 14, illumination lamps 80, 81, and 82 are respectively disposed above the subcontainers K, L, and M to illuminate them and the books 13b therein when the former are raised. In this case, even the empty subcontainer K can be recognized without being obstructed by the books 13a in the front row when the subcontainer K is raised. In another modification shown in FIG. 15, a single illumination lamp 83 is capable of changing its radiation angle so that it can be used for illuminating the subcontainers K, L, and M when they are raised.

In the above description, each subcontainer K, L, and M is designed to be raised separately. However, as shown in the end view of FIG. 16, a subcontainer N in the rear row may be pivoted to allow an operator to read the spines of the books 13b in the rear row. In this case, as shown in FIG. 17, the subcontainer N in the rear row can be pivoted by a single piston 84.

Figure 18:
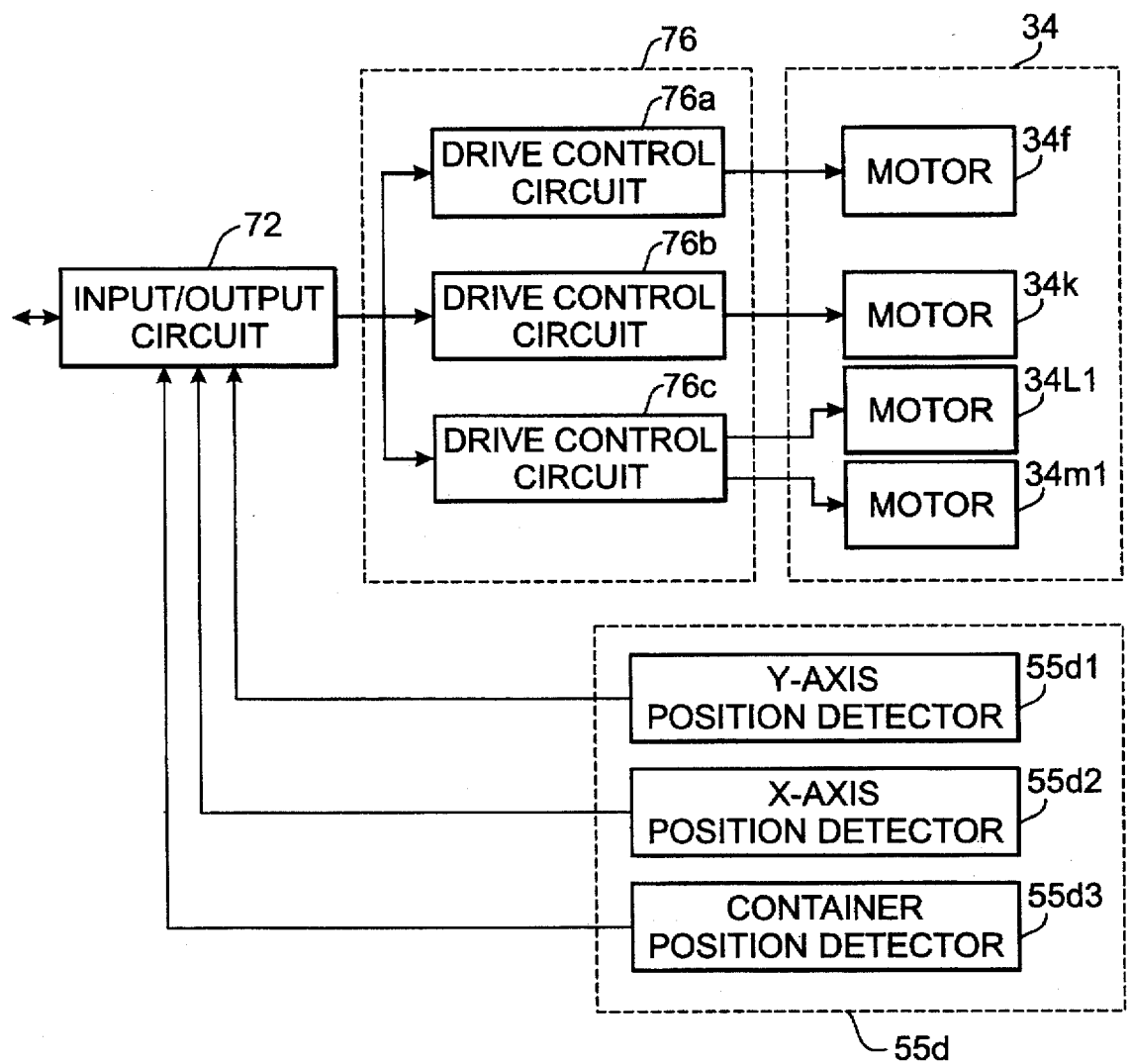
FIG. 18 is a block diagram for explaining the detailed arrangement of a control system for the automated positioning of a book relative to an opening in the container.

FIG. 18 shows the input/output circuit 72, the driving circuit 76, the stationary detector 55d, and the container support unit 34, each also shown in FIG. 5, as previously described. The description concerning the container support unit 35 is omitted since the it is controlled in the same manner as the container support unit 34.

Returning to FIG. 3B before describing FIG. 18, an x-y plane is defined in the top view of FIG. 3B by the screw shafts 34c and 34d which function as fixed y-axes and by the gear rack 34e which functions as a movable x-axis. The support plate 34h carrying the lift plate 34b serves as a movable point in the x-y plane. The container support unit 34 is provided with the following: the motor 34f for driving the gear rack 34e in the direction of the arrows a and B; the motor 34k for driving the support plate 34h shown in FIG. 3C in the direction of the arrows C and D; and motors 34L1 and 34m1, respectively, for raising the cylinders 34L and 34m which carry the lift plate 34b, as shown in both FIGS. 3B and 3C.

This embodiment employs pulse motors as the motors 34f and 34k, the rotating number and the rotating direction of which are determined in accordance with the number and polarity of a driving pulse input thereto. The lifting piston cylinders 34L and 34m comprise stick-like screws (not shown) fastened on fixed nuts (also not shown). The motor 34m1, for example, rotates the cylinder 34m upwardly. In this structure which is similar to that shown in FIG. 3E, the stick-like screws cooperate with the nuts and move in the rotating direction of the motor 34m1. By this action of the screws, the ascending/descending operation of the piston cylinder 34m can be obtained.

Returning to FIG. 18, the driving circuit 76 is provided with drive control circuits 76a and 76b for generating driving pulses to be applied to the motors 34f and 34k, and with a drive control circuit 76c for generating driving pulses to be applied to the motors 34L1 and 34m1. Each of the drive control circuits 76a, 76b and 76c receives a control signal output from the control circuit 67 shown in FIG. 5 via the input/output circuit 72, and then generates a driving pulse or a driving signal corresponding to the control signal.

Furthermore, the stationary detector 55d is provided with the following: a position limit switch or y-axis position detector 55d1 for detecting the position of the gear rack 34e along the y-axis defined by the screw shafts 34c and 34d (i.e. its position in the direction indicated by the arrows a and b in the top view of FIG. 3B); a position limit switch or x-axis position detector 55d2 for detecting the position of the support plate 34h along the x-axis defined by the movable gear rack 34e (i.e. its position in the direction indicated by the arrows c and d in the same top view of FIG. 3B); and a position limit switch or container position detector 55d3 for detecting whether the container 12 is stably held by the support bar 34a on the container support unit 34. As shown in FIG. 18, the outputs from the y-axis position detector 55d, the x-axis position detector 55d2, and the container position detector 55d3 are supplied back to the input/output circuit 72 so as to control respectively the driving control circuits 76a, 76b, and 76c.

Figure 19:
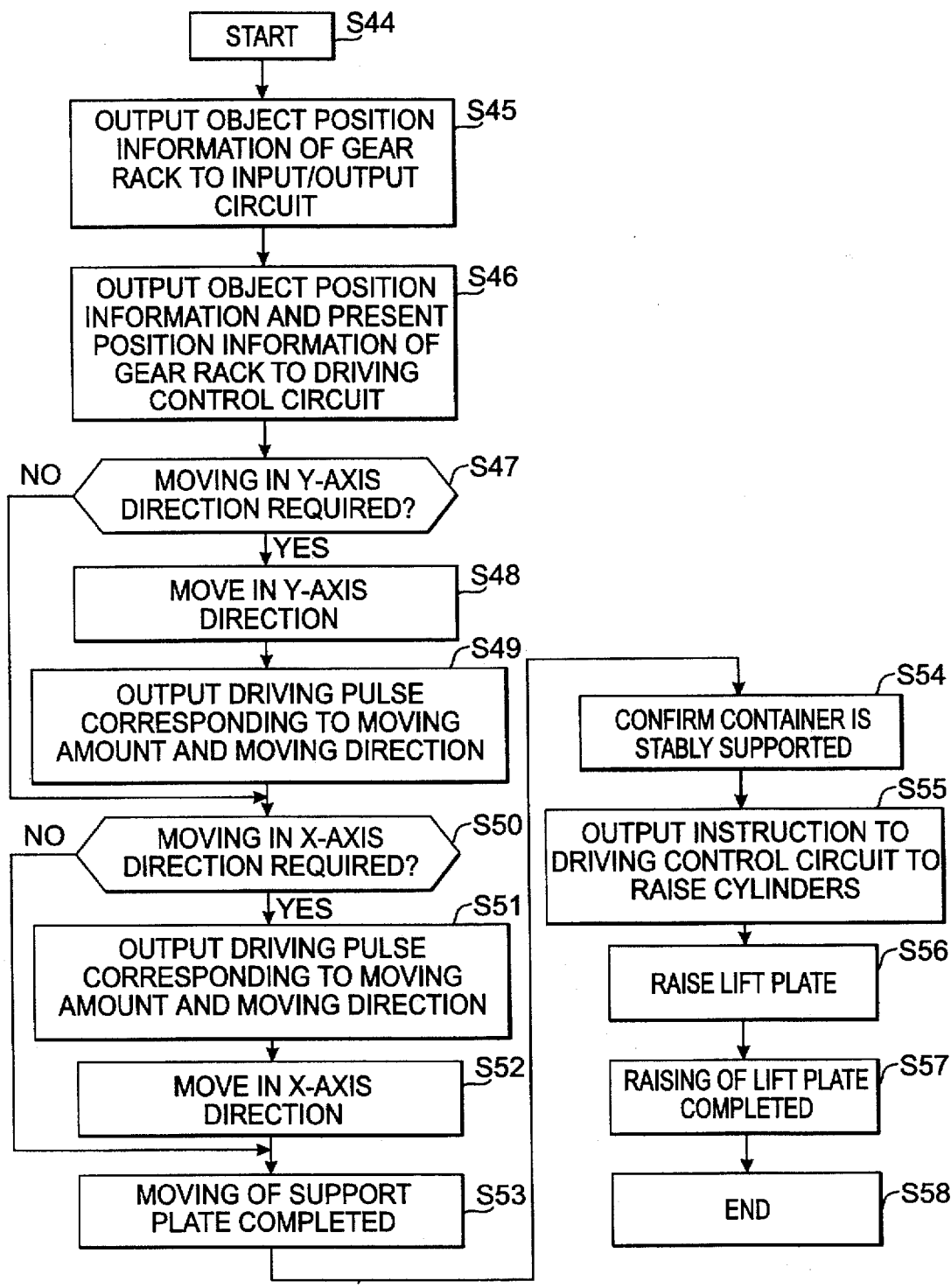
FIG. 19 is a flow chart for explaining an operation to be performed to control the motor and the automated positioning of the container in two directions.

By referring to the flow chart shown in FIG. 19, the operation is described for moving the support plate 34h so as to arrange selectively the lift plate 34b underneath the desired one of the openings 12a–12i in the bottom grid of the container 12 held on the container support unit 34. After step S44 (START), the CPU 42 outputs in step S45 object position information indicating which of the openings 12a–12i in the bottom grid of the container 12 above the support plate 34h is desired to be entered by the lift plate 34b (in short, information indicating the object position), and sends the object position information to the input/output circuit 72.

Then, the input/output circuit 72 outputs in step S46 the object position information and present position information for the support plate 34h to the driving control circuits 76a and 76b of the driving circuit 76. The present position information for the support plate 34h can be attained by storing the number and the polarity of the driving pulses previously supplied by the motors 34f and 34k as the y-axis position detected by the y-axis position detector 55d1 and also as the x-axis position detected by the x-axis position detector 55d2.

When the object position information and the present position information are supplied to the driving control circuits 76a and 76b in this manner, the driving control circuit 76a determines in step S47 whether or not the gear rack 34e carrying the support plate 34h needs to be moved in the y-axis direction (i.e. in the direction of the arrows a and b in the top view of FIG. 3B). In the case of "YES" when it is determined that the gear rack 34e needs to be moved along the y-axis, the driving control circuit 76a calculates in step S48 the moving amount and the moving direction of the gear rack 34e along the y-axis, and outputs the driving pulse corresponding to the moving amount and the moving direction in order to move the gear rack 34e along the y-axis in step S49.

In the case of "NO" in the step S47, it is determined that the gear rack 34e does not need to be moved along the y-axis.

The driving control circuit 76b determines in step S50 whether or not the support plate 34h needs to be moved along the x-axis (i.e. in the direction of arrows c and d in the top view of FIG. 3B) in order to move the support plate 34h to the desired object position In the case of "YES" the driving control circuit 76b determines that the support plate 34h needs to be moved along the x-axis defined by the gear rack 34e. The driving control circuit 76b calculates in step S51 the moving amount and the moving direction of the support plate 34h along the x-axis, and outputs to the motor 34k the driving pulse corresponding to the moving amount and the moving direction in order to move the support plate 34h along the x-axis, i.e. along the gear rack 34e, in step S52.

In the case of "NO" in the step S50, it is determined that the support plate 34h does not need to be moved along the x-axis defined by the gear rack 34e.

The input/output circuit 72 confirms in step S53 that the moving of the support plate 34h is completed, and in step S54, confirms that the container 12 is stably held by the frame-like support bar 34a of the support unit 34 on the basis of the detection by the container position detector 55d3. Then, the input/output circuit 72 gives the instruction to the driving control circuit 76c in step S55 to raise the piston cylinders 34L and 34m.

By this instruction, the driving control circuit 76c outputs in step S56 the driving signal to the motors 34L1 and 34m1 to raise the piston cylinders 34L and 34m such that the lift plate 34b ascends. When the input/output circuit 72 confirms that the raising of the lift plate 34b is completed, the whole process is finished (step S58).

By completing the above steps, the support plate 34h can be moved to the desired position underneath the desired opening 12a–12i in the bottom grid of the container 12 held on the container support unit 34, and the selected subcontainer A-I can be either raised or lowered.

The motors 34f and 34k for moving the support plate 34h in the x-y plane are pulse motors. The motors 34f and 34k, as shown in FIG. 3B, can precisely move the support plate 34h in FIG. 3C to the desired position by being supplied a driving pulse corresponding to the moving distance and the moving direction needed by the support plate 34h.

In the step S53 shown in FIG. 19, the input/output circuit 72 determines on the basis of the period of the passed time whether or not the moving of the support plate 34h along the x-axis is completed. More specifically, the input/output circuit 72 calculates the period of time required for moving the desired distance. When the calculated period of time is reached from the time of the supplying of the driving pulse necessary to move the support plate 34h to the desired position, the input/output circuit 72 determines that the moving of the support plate 34h along the x-axis is completed and stops any further movement.

Figure 20A:
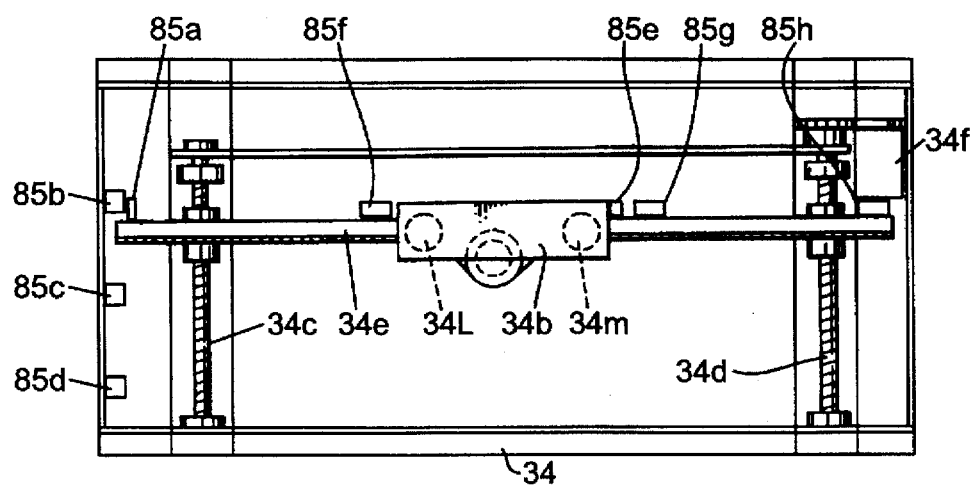
FIGS. 20A to 20C are top, side and end views, respectively, for explaining the device which controls movements of a lift plate.
Figure 20B:
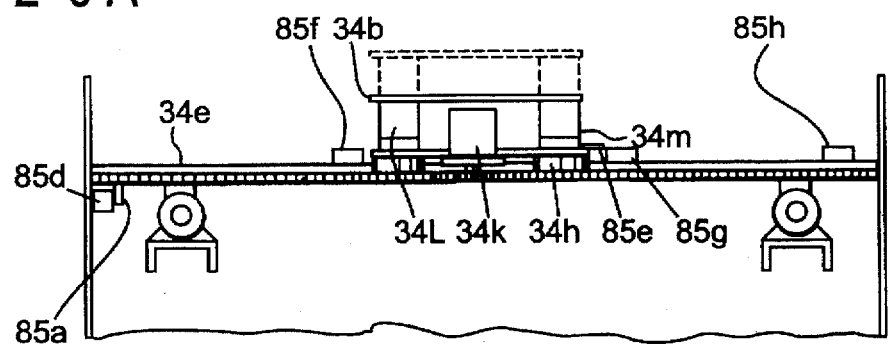
Figure 20C:
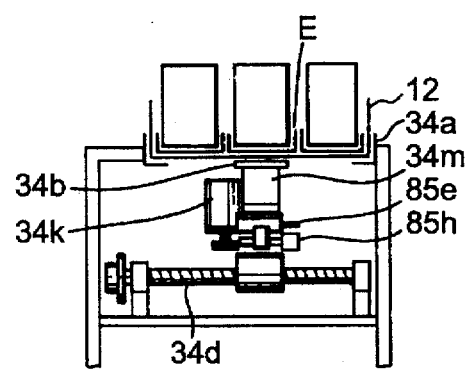

FIGS. 20A–20C illustrate a modification of the embodiment in which the moving of the support plate 34h is controlled in other ways. The structure is similar to that of FIGS. 3B–3D. FIGS. 20A–20C show that one end portion of the gear rack 34e is provided with a y-axis position detector 85a. In the container supporting unit 34, three position limit switches 85b, 85c, and 85d detect the y-axis position detector 85a and are disposed parallel to the longitudinal axis of the screw shafts 34c and 34d.

In the case where the gear rack 34e is moved along the screw shafts 34c and 34d on the y-axis, when the first position limit switch 85b detects the y-axis position detector 85a, the lift plate 34b is located at a position underneath the aligned openings 12a, 12b, and 12c in the bottom grid of the container 12. See FIG. 3A. When the second position limit switch 85c in FIG. 20A detects the y-axis position detector 85a, the lift plate 34b is located at a position underneath the aligned openings 12d, 12e, and 12f in FIG. 3A. When the third position limit switch 85d in FIG. 20A detects the y-axis position detector 85a, the lift plate 34b is located at a position underneath the aligned openings 12g, 12h, and 12i, also shown in FIG. 3A.

Referring to FIG. 20B, one end portion of the support plate 34h is provided with an x-axis position detector 85e. On the gear rack 34e, three position limit switches 85f, 85g, and 85h detect the x-axis position detector 85e and are disposed along the length of the gear rack 34e.

In the case where the support plate 34h is moved along the gear rack 34e defining the x-axis, when the first position limit switch 85f detects the x-axis position detector 85e, the lift plate 34b is located at a position underneath the aligned openings 12a, 12d, and 12g in the bottom grid of the container 12. See FIG. 3A. When the second position limit switch 85g of FIG. 20B detects the x-axis position detector 85e, the lift plate 34b is located at a position underneath the aligned openings 12b, 12e, and 12i in FIG. 3A. When the third position limit switch 85h of FIG. 20B detects the x-axis position detector 85e, the lift plate 34b is located at a position underneath the aligned openings 12c, 12f, and 12i shown in FIG. 3A.

In this modification of the embodiment shown in FIGS. 20A–20C, the motors 34f and 34k do not need to be pulse motors. The motors 34f and 34k merely have to drive the gear rack 34e till the desired one of the y-axis position limit switches 85b, 85c, and 85d detects the y-axis position detector 85a, and then the support plate 34h till the desired one of the x-axis position limit switches 85f, 85g, and 85h detects the x-axis position detector 85e.

The present invention is not limited to the above-described embodiments. Various changes and modifications can be made within the spirit and scope of the invention.

What I claim as my invention is as follows:

1. An automated storage/retrieval apparatus for removing and filing books, comprising:
   a plurality of containers, each having an inner space;
   a plurality of subcontainers located within each of said containers, each subcontainer including a plurality of books such that spines of the books face in one direction;
   a rack means for housing the plurality of containers;
   a working station for receiving and holding a designated container with a selected subcontainer storing a requested book;
   means for transferring the designated container from said rack means to the working station, and for returning the designated container from the working station to said rack means;
   lift plate means, located at said working station, for raising/lowering the selected subcontainer from the designated container at the working station to allow viewing of the spines of the plurality of books stored in the selected subcontainer so that the requested book can be removed therefrom; and
   wherein each of the plurality of containers has a bottom grid with openings formed therein at positions underneath aligned bottoms of the plurality of subcontainers so that said lift plate means is raised/lowered through a selected one of the openings in the bottom of the designated container to raise/lower the selected subcontainer with the requested book.

2. The apparatus according to claim 1, further comprising:
   a piston cylinder means for raising/lowering the lift plate means; and
   a support plate means for carrying the piston cylinder means underneath the bottom grid of the designated container to a position underneath the selected one of the openings formed in the bottom grid of the designated container.

3. The apparatus according to claim 2, further comprising:
   a pair of screw shafts disposed parallel to each other at the working station underneath the designated container; and
   a gear rack having end portions threadably engaged with the pair of screw shafts;
   whereby the gear rack is moved along a longitudinal direction of the screw shafts when the screw shafts are rotated and also whereby the support plate means is carried by the gear rack.

4. The apparatus according to claim 3, further comprising:
   motor means for moving the support plate means along a longitudinal axis of the gear rack.

5. The apparatus according to claim 4, wherein:
   said piston cylinder means includes a pair of lifting pistons, one of which is raised through the selected one of the openings in the bottom grid of the designated container to tilt the selected subcontainer so as to bring the plurality of books stored therein together to one side.

6. The apparatus according to claim 1, wherein:
   said working station includes display means for indicating the requested book to be removed from the plurality of books stored in the selected subcontainer raised by the lift plate means.

7. The apparatus according to claim 1, further comprising:
   a plurality of frame-like support bar means, arranged at the working station, for holding the designated container thereat.

8. The apparatus according to claim 1, further comprising:
   means for illuminating the selected subcontainer raised by the lift plate means at the working station.

9. The apparatus according to claim 1, wherein:
   said subcontainers occupying the inner space of the designated container are located only on a rear side thereof with respect to a side of the working station; and
   said lift plate means being operative to raise/lower only the selected subcontainer on the rear side of the designated container.

10. The apparatus according to claim 1, wherein:
    said transferring means includes stacker crane means for removing the designated container from the rack means and for returning the designated container to the rack means.

11. The apparatus according to claim 10, wherein:
    said transferring means includes a first conveyor for removing the designated container from the stacker crane means and also includes a second conveyor for transferring the designated container to the working station.

12. The apparatus according to claim 11, further comprising:
    a vertical elevator means for carrying the designated container in a vertical direction between the first conveyor and the second conveyor.

13. The apparatus according to claim 9, wherein:
    said lift plate means pivots the selected subcontainer on the rear side of the designated container with respect to said side of the working station, in a direction so that the spines of the plurality of books stored in the selected subcontainer can be viewed over another plurality of books stored in the other plurality of subcontainers located on a front side of the designated container with respect to said side of the working station.

* * * * *

UNITED STATES PATENT AND TRADEMARK OFFICE
CERTIFICATE OF CORRECTION

PATENT NO. : 5,690,463
DATED : November 25, 1997
INVENTOR(S) : Jinichi Yoshie

It is certified that error appears in the above-indentified patent and that said Letters Patent is hereby corrected as shown below:

In column 1, line 47, "Stack" should be --stack--.

In column 5, line 29, change "The" to --A--.

In column 8, line 57, after "11", insert --and--.

In column 10, line 35, delete "the" (first occurrence);
line 44, "B" should be --b--; and
line 46, "C and D" should be --c and d--.

In column 11, last line, after "position", insert a period.

Signed and Sealed this

Thirtieth Day of June, 1998

Attest:

BRUCE LEHMAN

Attesting Officer

Commissioner of Patents and Trademarks